United States Patent [19]
Compeau et al.

[11] Patent Number: 5,901,937
[45] Date of Patent: May 11, 1999

[54] APPARATUS FOR ATTACHING PERSONALIZED FIXTURES TO PERSONAL COMPUTER AND WORKSTATION MONITORS

[76] Inventors: Marc S. Compeau, 341 Sweeney Rd., Potsdam, N.Y. 13676; Steven G. Kraus, 16 Lakeview Dr., Mahopac, N.Y. 10541; Mark J. Cornett, 384 Bagdad Rd., Potsdam, N.Y. 13676

[21] Appl. No.: 08/869,134

[22] Filed: Jun. 4, 1997

[51] Int. Cl.[6] .................................................. B41J 11/02
[52] U.S. Cl. ...................................... 248/442.2; 248/205.1
[58] Field of Search ............................. 248/442.2, 918, 248/205.3, 205.1, 447.1; 403/97, 345, 359

[56] References Cited

U.S. PATENT DOCUMENTS

| | | | |
|---|---|---|---|
| 613,673 | 11/1898 | Fredrick | 74/551.4 |
| 1,436,544 | 11/1922 | Starr | 40/747 |
| 1,536,985 | 5/1925 | Swinford | 248/186.2 |
| 1,990,990 | 2/1935 | Hathorn | 74/519 |
| 4,344,719 | 8/1982 | Thom | 403/297 |
| 4,693,443 | 9/1987 | Drain | 248/447.1 |
| 4,869,565 | 9/1989 | Bachman | 312/234 |
| 4,917,343 | 4/1990 | Wainscott | 403/97 |
| 4,960,257 | 10/1990 | Waters | 248/442.2 |
| 4,978,093 | 12/1990 | Kennedy | 248/205.1 |
| 5,125,612 | 6/1992 | McNeal | 248/442.2 |
| 5,240,341 | 8/1993 | Peng | 403/59 |
| 5,301,915 | 4/1994 | Bahniuk et al. | 248/452 |
| 5,408,774 | 4/1995 | Grewe et al. | 40/606 |
| 5,664,673 | 9/1997 | Perry | 206/37.1 |
| 5,678,792 | 10/1997 | Arguin et al. | 248/205.1 |

*Primary Examiner*—Ramon O. Ramirez
*Assistant Examiner*—Anita M. King
*Attorney, Agent, or Firm*—Howard J. Greenwald

[57] ABSTRACT

A device for attaching one or more personalized fixtures to a video monitor. This device contains at least one track with a first surface and a second surface; the first surface contains adhesive, and the second surface is comprised of a splined receptacle. The device also contains at least two separate personalized fixtures, each of which is integrally connected to a splined connector.

7 Claims, 5 Drawing Sheets

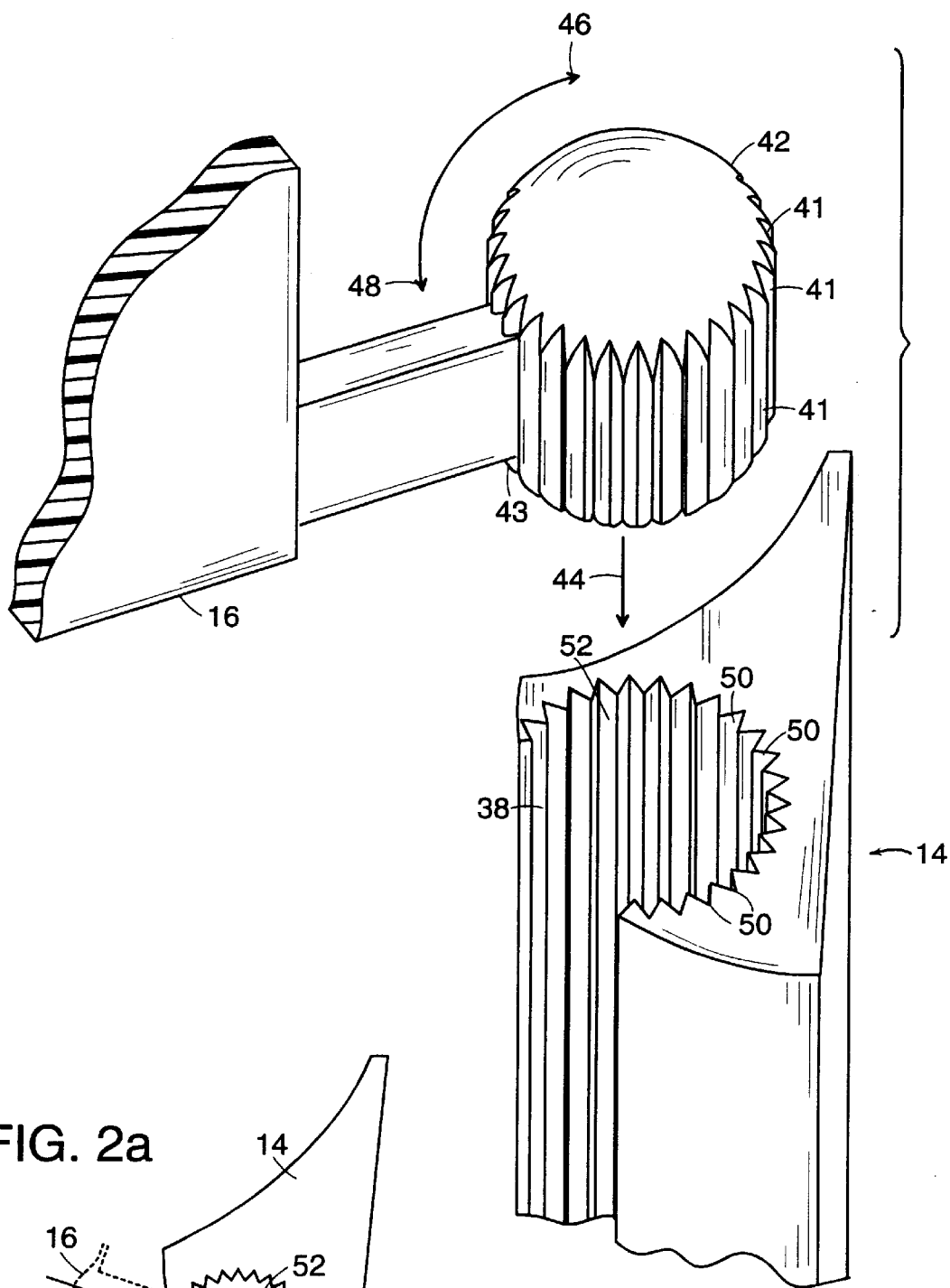
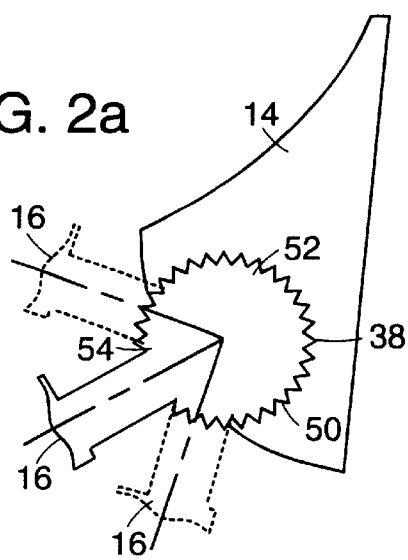
FIG. 2a
FIG. 2

APPARATUS FOR ATTACHING PERSONALIZED FIXTURES TO PERSONAL COMPUTER AND WORKSTATION MONITORS

FIELD OF THE INVENTION

A device for attaching one or more personalized fixtures to a video monitor.

BACKGROUND OF THE INVENTION

Assemblies which can attach a device to a computer monitor are well known. Thus, by way of illustration, such assemblies are disclosed in U.S. Pat. Nos. 4,869,565 of Bachman and 5,301,915 of Bahniuk et al. The disclosure of each of these patents is hereby incorporated by reference herein.

The Bachman patent discloses a universally adjustable display apparatus for fitment about and affixation to the housing of a computer monitor screen. However, the device of this patent is not flexible, i.e., it does not allow the user to decide among several different configurations which provide one or more personalized fixtures located at one or more places on the periphery of the monitor screen.

The Bahniuk et al. patent discloses a note holder board which comprises a support means to be secured to the top or side of a monitor screen and an extending panel the bottom of which interconnects with the supports means. However, like the device of the Bachman patent, this latter device also does not provide flexibility to the user. Thus, one may only affix a noteboard to the computer monitor, and that fixture may only be affixed in a limited range of positions.

It is an object of this invention to provide an assembly for attaching one or more personalized fixtures to a video monitor in a multiplicity of positions at a multiplicity of locations.

It is another object of this invention to provide a device for attaching one or more personalized fixtures to a video monitor, wherein the position of the device vis-a-vis the video monitor can be readily changed.

It is yet another object of this invention to provide a device for attaching one or more personalized fixtures to a video monitor, wherein such device is securely but removably attached to said video monitor.

These and other objects of the invention will be readily apparent to those skilled in the art upon a reading of the specification.

SUMMARY OF THE INVENTION

In accordance with this invention, there is provided a device for attaching one or more personalized fixtures to a video monitor. This device comprises at least one track with a first surface and a second surface; the first surface contains adhesive, and the second surface is comprised of a splined receptacle extending substantially the entire length of said track. The device also contains at least two separate personalized fixtures, each of which is integrally connected to a splined connector adapted to mate with the splined receptacle.

BRIEF DESCRIPTION OF THE DRAWINGS

The present invention will be more fully understood by reference to the following detailed description thereof, when read in conjunction with the attached drawings, wherein like reference numerals refer to like elements, and wherein:

FIG. 2 is partial, exploded view of the assembly of FIG. 1;

FIG. 2A is a schematic representation illustrating how the splined connector of this invention may be disposed at various angles with regard to the splined receptacle of the invention.

DESCRIPTION OF THE PREFERRED EMBODIMENTS

Figure 1:
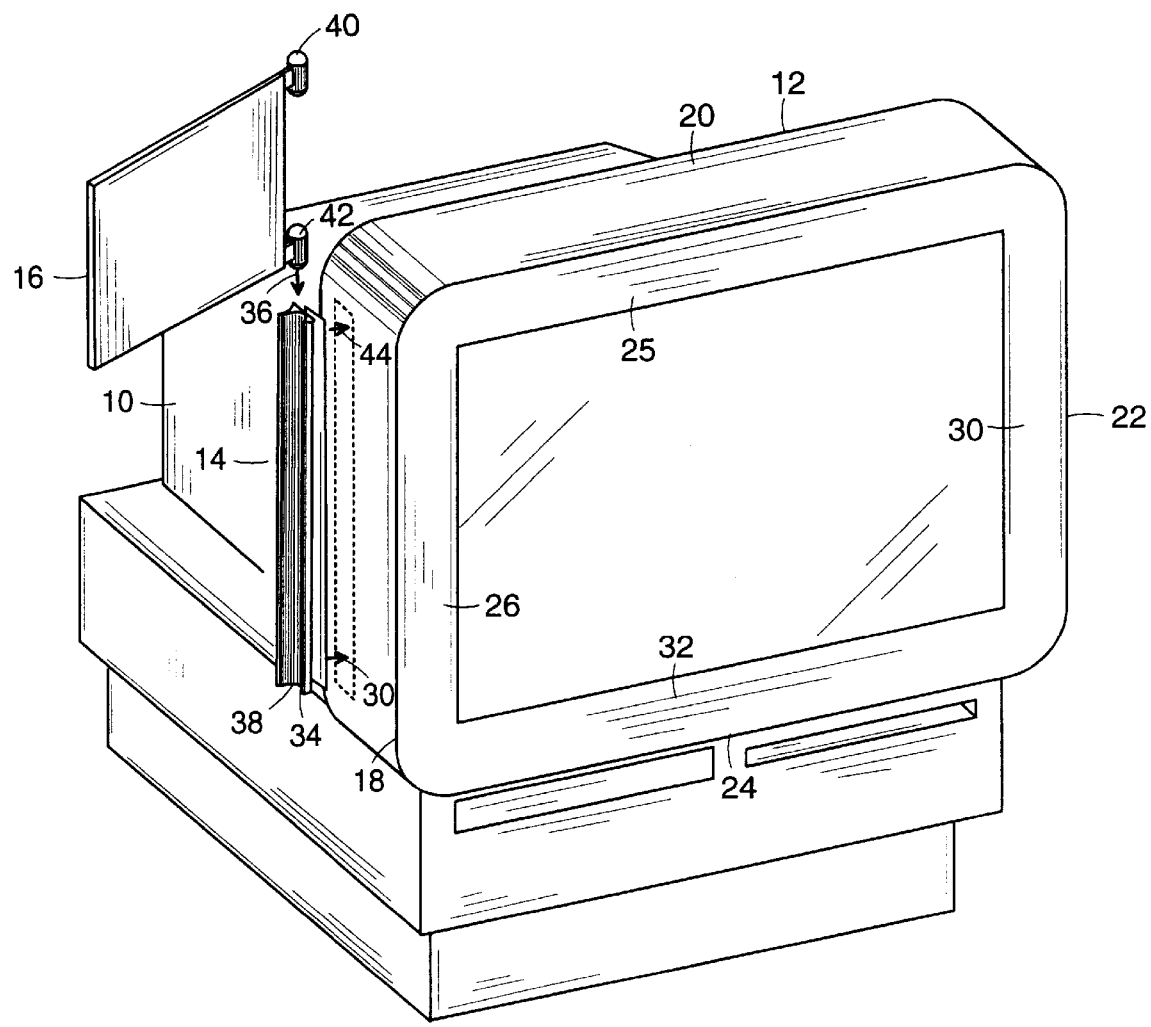
FIG. 1 is a perspective view of one preferred embodiment of the assembly of this invention attached to a computer monitor.

FIG. 1 is a perspective view of an attachment assembly 10 attached to a computer monitor 12.

Although FIG. 1 depicts assembly 10 being attached to monitor 12, it will be apparent to those skilled in the art that the assembly 10 can be attached to other surfaces of other devices such as, e.g., to the case of a central processing unit, to a keyboard, a laptop computer, to a desk, etc. For the sake of convenience, and without limitation, the remainder of this specification will refer to the attachment of assembly 10 to a video monitor such as, e.g. computer monitor 12.

One may attach assembly 10 to any video monitor. By way of illustration and not limitation, one may attach assembly 10 to one or more of the video monitors described in U.S. Pat. Nos. 5,301,915, 4,869,565, 5,549,268 (a self-contained monitor in a laptop computer), 5,328,145 (video display screen housing), 5,398,905 (computerized display screen), 5,549,267, 5,564,209, 4,902,078, 5,035,392, and the like. The disclosure of each of these United States patents is hereby incorporated by reference into this specification.

Referring again to FIG. 1, it will be seen that assembly 10 is comprised of track 14 and, removably attachable thereto, personalized fixture 16.

In the embodiment depicted in FIG. 1, track 14 is removably attached to side 18 of monitor 12. It will be apparent to those skilled in the art that, depending upon the choices made by a user, track 14 may alternatively be attached to sides 20, 22, or 24 of monitor 12. Alternatively, or additionally, one may also attach track 14 on one or more of the front surfaces 26, 28, 30, and 32 of monitor 12. As will be apparent to those skilled in the art, the number of places on which track 14 may be mounted is limited only by the imagination of the user.

In the embodiment depicted in FIG. 1, only one track 14 is illustrated. As will be apparent to those skilled in the art, one may use two track 14's, three track 14's, or four or more track 14's. In one embodiment, assembly 10 is comprised of four track 14's.

Referring again to FIG. 1, and in the preferred embodiment depicted therein, track 14 is attached to side 18 of monitor 12 be removing tape 34 from the bottom surface of track 14 and then pressing track 14 in the direction of arrows 36 until adhesive on such bottom surface (not shown) contacts side 18.

Although not well illustrated in FIG. 1, track 14 is comprised of a splined receptacle 38 into which splined connectors 40 and 42 may be removably disposed. These features are illustrated in more detail in the other drawings of this case. As is illustrated in FIG. 1, connectors 40 and 42 may be aligned with receptacle 38 and then moved in the direction of arrows 44 to effect the removable interconnection of personalized fixture 16 and track 14.

FIG. 2 is a partial sectional view illustrating splined connector 42 and how it may be disposed within splined receptacle 38.

Referring to FIG. 2, and in the preferred embodiment depicted therein, it will be seen that the teeth 41 of splined connector 42 do not extend around the entire periphery of connector 42: the portion 43 of connector 42 does not contain such teeth 41.

It is preferred in the assembly of this invention that the teeth disposed about the periphery of splined connector 42 extend over from about 50 to about 100 percent of such periphery and, more preferably, from about 70 to about 90 percent of such periphery. In an even more preferred embodiment, the teeth 41 extend over from about 70 to about 80 percent of such periphery.

As will be apparent to those skilled in the art, FIG. 2 illustrates only one of many splined connectors 42 which may be used in the apparatus 10 of this invention. Thus, by way of illustration and not limitation, one may use one or more the splined connectors described in one or more of U.S. Pat. Nos. 5,605,337 (splined shaft), 5,599,282, 5,592, 761 (splined fittings), 5,588,404 (splined hub), 5,560,461 (element with externally splined surface), 5,542,686 (splined insert), 5,527,229 (element with splined internal ends), 5,509,315 (element with splined attachment), 5,501, 580, 5,460,578 (splined coupling), 4,458,427 (slidable tubular splined member), and the like. The disclosure of each of these United States patents is hereby incorporated by reference into this specification.

Referring again to FIG. 2, splined connector 42 may be moved in the direction of arrow 44 until it is interlockably disposed within splined receptacle 38. As is more readily illustrated in FIG. 3, by rotating splined connector 42 in the direction of arrows 46 or 48, one may vary the angle at which personalized fixture 16 is attached to computer monitor 12 (not shown).

The splined receptacle 38 is adapted to receive one or more of splined connectors 42 and removably and lockably form a connection with such connector(s) 42. Means of forming such a connection with splined receptacles are well known to those skilled in the art. Thus, e.g., one may use one or more of the splined receptacles disclosed in U.S. Pat. Nos. 5,601,380 (internally splined member), 5,584,584 (splined inner face), 5,573,346 (internally splined tube), 5,566,816 (member with a splined center opening), 5,544,727 (member with a slidably splined connection), 5,522,669 (member with an internally splined opening), 5,492,391 (member with a splined intermediate longitudinal portion provided with grooves), and the like. The disclosure of each of these United States patents is hereby incorporated by reference into this specification.

FIG. 2A is a schematic representation illustrating how the splined connector 42 of assembly, and the assembly 16 to which it is attached, may be disposed at various angles with regard to the splined receptacle 38 of assembly 10. As will be apparent to those skilled in the art, the splined receptacle 38 is comprised of a cavity 52 (see FIG. 2) whose cross-sectional shape contains grooves 50 adapted to accept splined teeth 41 over only a portion of its cross-sectional shape. As is illustrated in FIG. 2A, the shaded portion 54 of cavity 52 does not contain grooves 50 in order to allow the ready insertion of connector 42 into receptacle 38.

In general, it is preferred that at least about 30 percent of the cross-sectional shape of cavity 52 not contain grooves 50.

In one embodiment, illustrated in FIGS. 1, 2, 2a, 3, and 4, the spline grooves 50 extend substantially the entire length of track 14. In another embodiment, not shown, the spline grooves 50 extend from about 70 to about 90 percent of the length of track 14. Other embodiments will be apparent to those skilled in the art.

Figure 3:
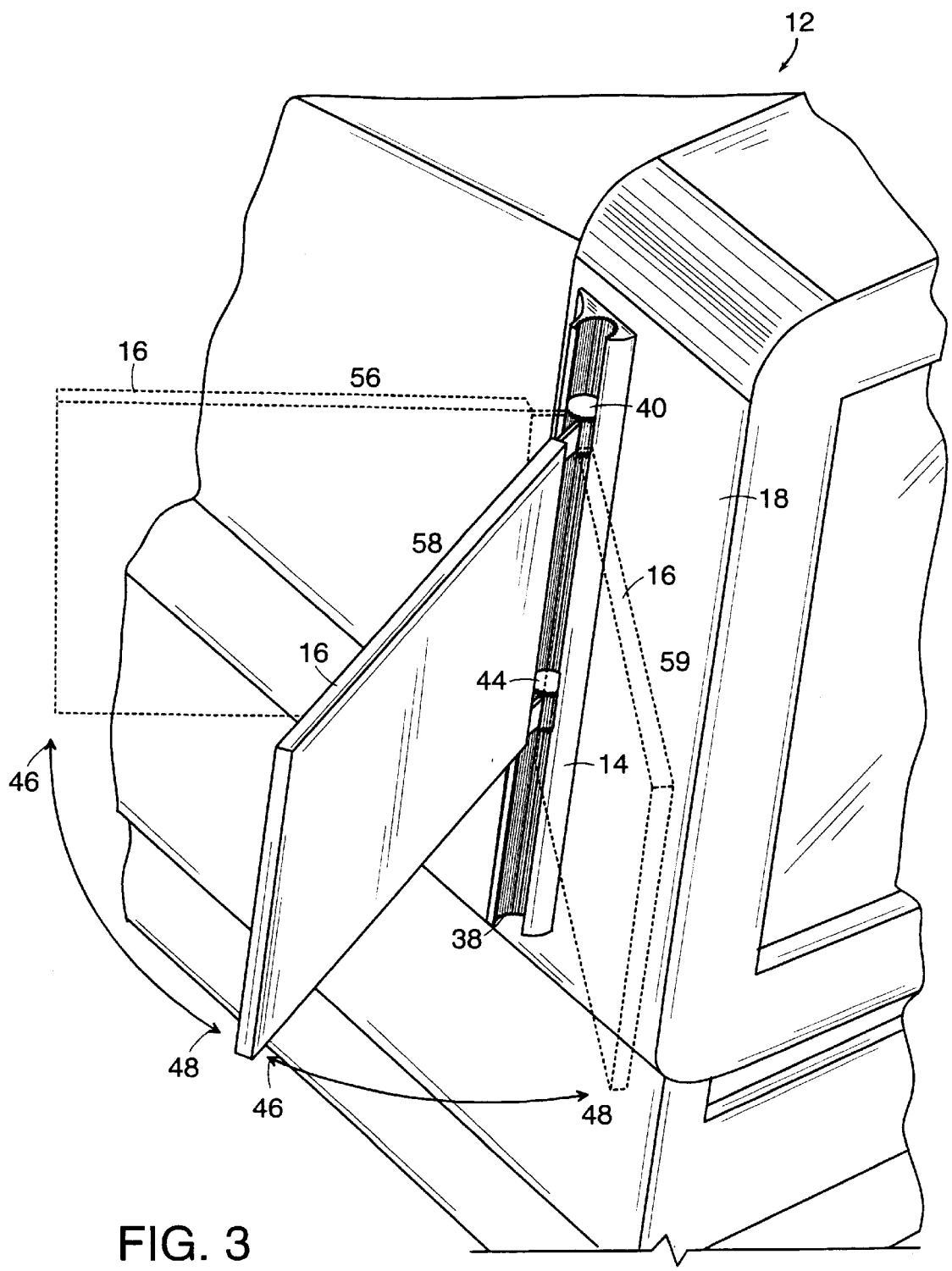
FIG. 3 is a partial perspective view of the assembly of FIG. 1, showing a personalized fixture in one of several possible positions with respect to the computer monitor.

FIG. 3, in a manner similar to FIG. 2, illustrates the various angles that may be formed between personalized fixture 16 and computer monitor 12 by choosing the angle at which connectors 40 and 42 are inserted within receptacle 38. In the embodiment depicted in FIG. 3, the angle formed between positions 56 and 58 of fixture 16 is about 45 degrees, and the angle formed between positions 58 and 59 of fixture 16 is also about 45 degrees. As will be apparent to those skilled in the art, many other arrangements are possible.

Figure 4:
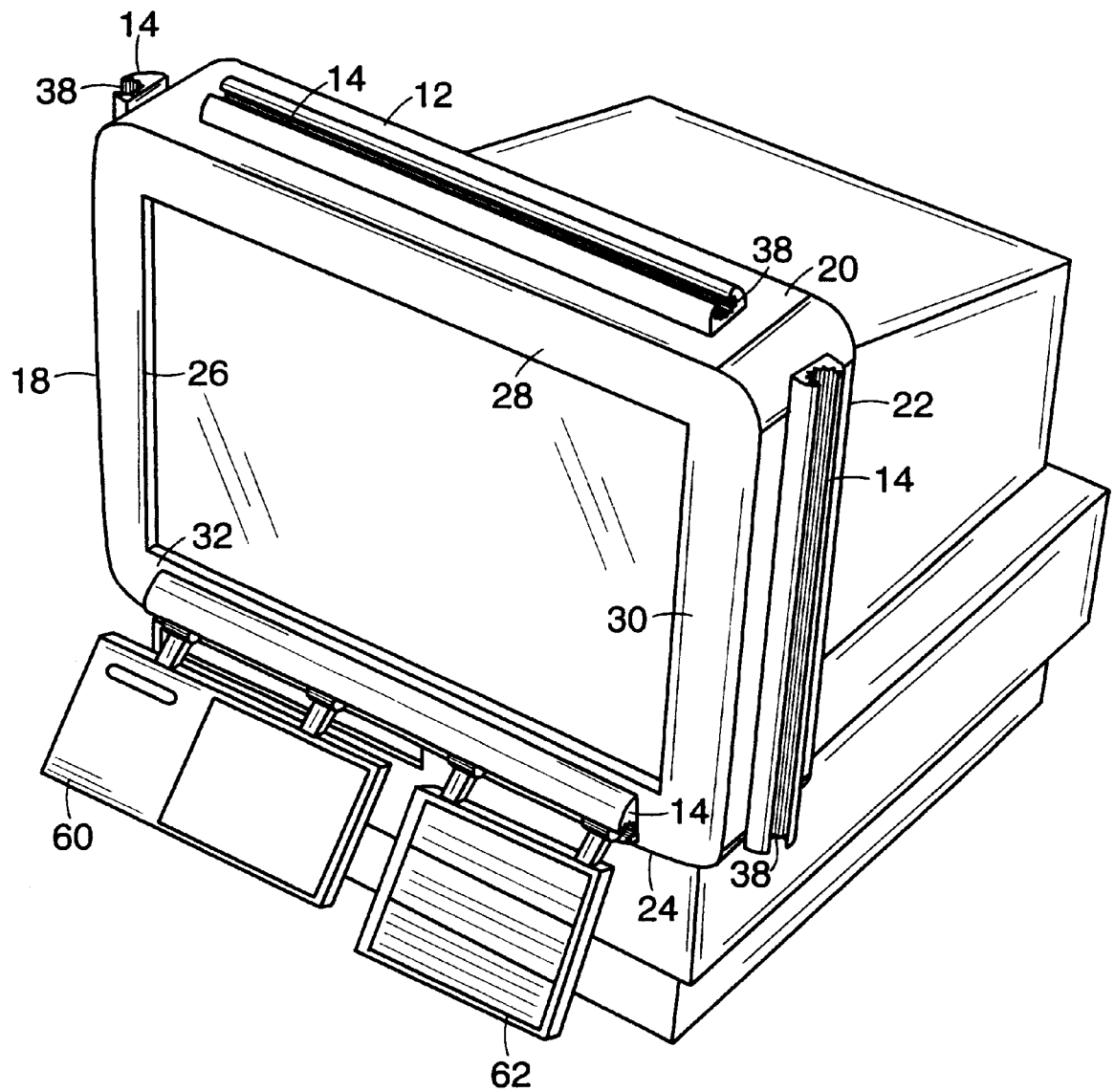
FIG. 4 is a perspective view of another preferred embodiment of the assembly this invention attached to a computer monitor.

FIG. 4 illustrates another possible use of the assembly 10 of this invention. In the embodiment depicted in this Figure, there are four track 14's used, and the personalized fixtures 60 and 62 are disposed on the track 14 connected to front face 32 of computer monitor 12. As will be apparent to those skilled in the art, more or fewer track 14's may be used, they may be disposed at different and/or additional locations on computer monitor 12, the personalized fixture(s) 60 and 62 may be disposed at different and/or additional locations on the same and/or different track 14's, and the personalized fixtures 60 and 62 may be disposed at the same and/or different angles on the same and/or different track 14's.

In the embodiment in FIG. 4, self-stick note pad dispenser and organizer 60 and note pad holder 62 are removably attached to the computer 12.

As will be apparent to those skilled in the art, other personalized modules may be removably attached to the compute 12.

Thus, by way of illustration and not limitation, one may attach one or more pen holders such as, e.g., those disclosed in U.S. Pat. Nos. 5,405,024, 5,259,095, 5,178,285, 4,948, 172, 4,669,617, and the like. The disclosure of each of these United States patents is hereby incorporated by reference into this specification.

Thus, by way of illustration and not limitation, one may attach one or more tape dispensers such as, e.g., those disclosed in U.S. Pat. Nos. 5,595,626, 5,562,262, 5,482,182, .5,472,560, 5,456,790, and the like. The disclosure of each of these United States patents is hereby incorporated by reference into this specification.

Thus, by way of illustration and not limitation, one may attach one or more calendar holders such as, e.g., those disclosed in U.S. Pat. Nos. 4,457,088, D371,387, D369,828, D338,914, D323,188, and the like. The disclosure of each of these United States patents is hereby incorporated by reference into this specification.

Thus, by way of illustration and not limitation, one may attach one or more business card holders such as, e.g., those disclosed in U.S. Pat. Nos. 5,572,815, 5,275,288, D377,808, D343,638, D335,028, and the like. The disclosure of each of these United States patents is hereby incorporated by reference into this specification.

Thus, by way of illustration and not limitation, one may attach one or more calculator holders such as, e.g., those disclosed in U.S. Pat. Nos. 4,832,191, 4,801,059, D333,159, D333,158, D253,438, and the like. The disclosure of each of these United States patents is hereby incorporated by reference into this specification.

Thus, by way of illustration and not limitation, one may attach one or more self-stick note holders such as, e.g., those disclosed in U.S. Pat. Nos. 4,427,254, 5,286,546, D357,938, and the like. The disclosure of each of these United States patents is hereby incorporated by reference into this specification.

Thus, by way of illustration and not limitation, one may attach one or more note pad holders such as, e.g., those disclosed in U.S. Pat. Nos. 5,598,921, 5,485,944, 5,480,037, 5,472,128, 5,427,254, 5,152,405, 5,100,178, 3,697,737, and the like. The disclosure of each of these United States patents is hereby incorporated by reference into this specification.

Thus, by way of illustration and not limitation, one may attach one or more picture frames such as, e.g., those disclosed in U.S. Pat. Nos. 5,596,829, 5,585,240, 5,581,925, 5,546,689, 5,533,290, and the like. The disclosure of each of these United States patents is hereby incorporated by reference into this specification.

Thus, by way of illustration and not limitation, one may attach one or more dry erase boards such as, e.g., those disclosed in U.S. Pat. Nos. 5,527,768, 5,496,036, D377,968, and the like. The disclosure of each of these United States patents is hereby incorporated by reference into this specification.

Thus, by way of illustration and not limitation, one may attach one or more cork boards or bulletin boards such as, e.g., those disclosed in U.S. Pat. Nos. 5,527,568, 5,507,459, 5,342,665, 4,721,644, 4,319,422, and the like. The disclosure of each of these United States patents is hereby incorporated by reference into this specification.

Other personalized fixtures which may be attached to the computer monitor via the assembly 10 of this invention will be apparent to those skilled in the art.

Figure 5:
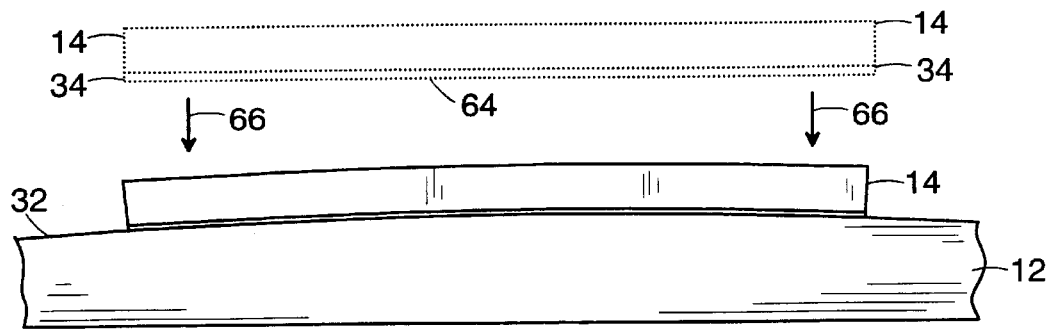
FIG. 5 is a schematic representation illustrating how the track of the assembly of FIG. 1 may be attached to front of the computer monitor.

FIG. 5 illustrates one preferred means for attaching track 14 to the front surface 32 of computer monitor 12. In the preferred embodiment depicted, the bottom surface 64 of track 14 contains a self-stick, pressure-sensitive adhesive 34 which, when track 14 is pressed in the direction of arrows 66, conforms to the slightly curved surface of surface 32 and securely attaches track 14 thereto.

In the embodiments depicted in FIGS. 1 and 5, a double sided tape 34 containing pressure-sensitive adhesive is depicted. Other suitable embodiments will be apparent to those skilled in the art.

It is preferred, when adhesive is used to attach track 14 to a surface, to use a pressure-sensitive adhesive such as, e.g., one or more of the pressure-sensitive adhesives disclosed in U.S. Pat. Nos. 5,623,000, 5,622,783, 5,616,670, 5,614,311, 5,612,440, and the like. The disclosure of each of these United States patents is hereby incorporated by reference into this specification.

Figure 6:
FIG. 6 is a front view of one embodiment of a personalized fixture.

FIG. 6 depicts a dry erase board 68 which is integrally connected to a splined connector 70 which extends substantially the entire length of dry erase board 68. As will apparent to those skilled in the art, one splined connector 70 (or similar splined connector) may be used for each personalized fixture to be attached, or one may use two such splined connectors, or one may use three such splined connectors, etc.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

We claim:

1. An apparatus for attaching a fixture to a video monitor comprising a first track, a first fixture, and a second fixture, wherein:

said first track is comprised of an outer surface and an inner surface, wherein said outer surface contains an adhesive material secured thereon, said adhesive material adapted to secure said first track to said video monitor, and said inner surface comprised as a splined receptacle being formed as an open, arcuate channel having a longitudinally extending opening, said inner surface comprised of a multiplicity of longitudinally extending grooves extending radially outwardly from substantially the entire concave, arcuate surface of said inner surface, said concave arcuate surface extending at least 60 percent of the total circumference of the circle formed by the radius of the arcuate channel and said longitudinal slot being at least 30 percent of the total circumference of the circle formed by the radius of the arcuate channel, said splined receptacle extending approximately 70 to 100 percent of the length of said track, each of said first fixture and said second fixture having an integrally attached splined connector cantileverally attached to an edge thereof, each of said connectors being substantially cylindrical in their longitudinal shape and having a plurality of longitudinally extending teeth extending outwardly for the outer surface of each of said connectors, whereby said teeth of each of said splined connectors is adapted to cooperate with the grooves of said first track and whereby said fixtures may be incrementally adjusted in an angular manner relative to said first track for repositioning said fixtures relative to said video monitor only by longitudinally sliding each of said fixtures from the first track, rotating said fixture, and sliding the connector of each of said fixtures back onto the first track.

2. The apparatus as recited in claim 1, wherein said apparatus is comprised of a second track.

3. The apparatus as recited in claim 2, wherein said apparatus is comprised of a third track.

4. The apparatus as recited in claim 3, wherein said apparatus is comprised of a fourth track.

5. The apparatus as recited in claim 1, wherein said splined receptacle extends approximately 70 to 90 percent of the length of said track.

6. The apparatus as recited in claim 1, wherein said first fixture is comprised of a dry erase board.

7. The apparatus as recited in claim 1, wherein said first fixture is a self-stick notepad dispenser.

* * * * *